United States Patent
Lawandy (10) Patent No.: US 7,119,161 B2
(45) Date of Patent: Oct. 10, 2006

(54) ANISOTROPIC NANOPARTICLES AND ANISOTROPIC NANOSTRUCTURES AND PIXELS, DISPLAYS AND INKS USING THEM

(75) Inventor: Nabil M. Lawandy, Saunderstown, RI (US)

(73) Assignee: Solaris Nanosciences, Inc., Providence, RI (US)

( * ) Notice: Subject to any disclaimer, the term of this patent is extended or adjusted under 35 U.S.C. 154(b) by 0 days.

(21) Appl. No.: 11/096,221

(22) Filed: Mar. 31, 2005

(65) Prior Publication Data

US 2005/0218377 A1 Oct. 6, 2005

Related U.S. Application Data

(60) Provisional application No. 60/591,486, filed on Jul. 27, 2004, provisional application No. 60/557,955, filed on Mar. 31, 2004.

(51) Int. Cl.
*C08G 63/00* (2006.01)
(52) U.S. Cl. .................. 528/190; 345/211; 349/141; 349/187
(58) Field of Classification Search ................ 345/211; 349/141, 187; 528/190
See application file for complete search history.

(56) References Cited

U.S. PATENT DOCUMENTS

| 5,882,779 | A | 3/1999 | Lawandy |
| 6,422,687 | B1 * | 7/2002 | Jacobson ............... 347/55 |
| 2002/0013098 | A1 * | 1/2002 | Triepels et al. ........ 439/625 |
| 2005/0088079 | A1 * | 4/2005 | Daniels ................. 313/504 |

OTHER PUBLICATIONS

Dutta, Joydeep et al. Self-Organization of Colloidal Nanoparticles, Swiss federal Inst. of Technology, vol. X, pp. 1-23.*
Castellano, J.A., Handbook of Display Technology, *Fundamentals and Trends*, Academic Press, pp. 215-231, 1992.
Quinten, M., "Optical Effects Associated with Aggregates of Clusters," *Journal of Cluster Science*, vol. 10, No. 2, 1999.
Kotov et al., *J. Phys. Chem.*, 99, 13065, 1995.
Van Duyne et al., "Electromagnetic Mechanism of Surface-enhanced Spectroscopy," Handbook of Vibrational Spectroscopy, John Wiley & Sons Ltd., 2002.
Jana, N.R. et al., *J. Phys. Chem.*, B 105, 4065, 2001.
Correa-Duante et al., "Linear Assemblies of Silica-Coated Gold Nanoparticles using Carbon Nanotubes as Templates," Adv. Mater, 16(23), p. 2179, 2004.
Murphy, C.J., "Controlling the Aspect Ratio of Inorganic Nanorods and Nanowires," Adv. Mater, 14(80), 2002.
Van der Zande et al., "Alignment of Rod-shaped Gold Particles by Electric Fields," *J. Phys. Chem.*, B 103(5754), 1999.
Dierking et al., "Aligning and Reorienting Carbon Nanotubes with Nematic Liquid Crystals," Adv. Mater, 16(11) p. 865, 2004.
Alivisatos, P.A. et al., "Organization of 'nanocrystal molecules' using DNA," *Nature*, 382(609), 1996.
Liz-Marzán, L., "Nanometals: formation and color," *Materialstoday*, pp. 26-31, Feb. 2004.

* cited by examiner

*Primary Examiner*—Terressa Boykin
(74) *Attorney, Agent, or Firm*—Lowrie, Lando& Anastasi, LLP (57) ABSTRACT

A pixel that includes a liquid crystal material and one or more of an anisotropic nanoparticle and an anisotropic nanostructure is provided. Displays including the pixel are also disclosed. An ink which includes a liquid crystal material and one or more of an anisotropic nanoparticle and an anisotropic nanostructure is also provided.

24 Claims, 5 Drawing Sheets

ANISOTROPIC NANOPARTICLES AND ANISOTROPIC NANOSTRUCTURES AND PIXELS, DISPLAYS AND INKS USING THEM

PRIORITY APPLICATIONS

This application claims the benefit under 35 U.S.C. § 119(e) to U.S. Provisional Application No. 60/557,955 filed Mar. 31, 2004 and entitled "ALIGNMENT OF ANISOTROPIC NANOSTRUCTURES FOR DISPLAY APPLICATIONS," and to U.S. Provisional Application No. 60/591,486 filed Jul. 27, 2004 and entitled "ALIGNMENT OF ANISOTROPIC NANOSTRUCTURES FOR DISPLAY APPLICATIONS," the entire disclosures of each of which are hereby incorporated herein by reference for all purposes.

FIELD OF THE TECHNOLOGY

Certain examples disclosed herein relate to the use of anisotropic nanoparticles and anisotropic nanostructures in pixels, displays and inks. More particularly, certain examples disclosed herein relate to the use of liquid crystal materials and metallic and semiconducting nanostructures with asymmetric shapes to provide optically improved pixel, displays and/or inks.

BACKGROUND

Localized surface plasmons have been observed since the Romans who used gold and silver nanoparticles to create colored glass objects such as the Lycurgus Cup ($4^{th}$ Century AD). A gold sol in the British museum, created by Michael Faraday in 1857, is still exhibiting its red color due to the plasmon resonance at ~530 nm. In more recent times, localized plasmons have been observed on rough surfaces and in engineered nanostructures and have led to the observation and exploitation of Surface Enhanced Raman Scattering (SERS) and new tunable plasmon structures with potential applications in biology and medicine.

SUMMARY

In accordance with a first aspect, a pixel is provided. In certain examples, the pixel comprises a liquid crystal material and an anisotropic nanoparticle. In other examples, the pixel comprises a liquid crystal material and an anisotropic nanostructure. In certain examples, the pixel may include a liquid crystal material, an anisotropic nanoparticle and an anisotropic nanostructure. In some examples, the pixel may include a liquid crystal material and a plurality of anisotropic nanoparticles and/or a plurality of anisotropic nanostructures, each of which may or may not be encapsulated.

In accordance with an additional aspect, a liquid crystal display is disclosed. In certain examples, the liquid crystal display comprises a pixel that includes a liquid crystal material and an anisotropic nanoparticle. In other examples, the liquid crystal display comprises a pixel that includes a liquid crystal material and an anisotropic nanostructure. In certain examples, the display comprises a pixel that includes a liquid crystal material, an anisotropic nanoparticle and an anisotropic nanostructure. In some examples, the liquid crystal display comprises a plurality of pixels wherein each of the pixels includes a liquid crystal material and one or more of an anisotropic nanoparticle or an anisotropic nanostructure.

In accordance with another aspect, an ink comprising a liquid crystal material and one or more of an anisotropic nanoparticle or an anisotropic nanostructure is disclosed. In certain examples, the ink comprises a liquid crystal material and plurality of anisotropic nanoparticles and/or a plurality of anisotropic nanostructures. In some examples, the liquid crystal material and the anisotropic nanoparticle, or the plurality of anisotropic nanoparticles, may be encapsulated to form microcapsules. In other examples, the liquid crystal material and the anisotropic nanostructure, or the plurality of anisotropic nanostructures, may be encapsulated to form microcapsules. In some examples, the ink may also include a carrier.

In accordance with an additional aspect, a method of doping a liquid crystal display pixel is disclosed. In certain examples, the method includes doping a liquid crystal display pixel with one or more of an anisotropic nanoparticle or an anisotropic nanostructure. The liquid crystal display pixel typically includes a liquid crystal material to which nanoparticle dopant or nanostructure dopant is added.

These and other aspects and features are further described in more detail below, and additional aspects and features that use the technology described herein will be readily selected by the person of ordinary skill in the art, given the benefit of this disclosure.

BRIEF DESCRIPTION OF THE FIGURES

Certain examples are described below with reference to the accompanying figures in which.

It will be recognized by the person of ordinary skill in the art, given the benefit of this disclosure, that certain features or components in the figures may have been enlarged or distorted relative to the size or dimensions of other features or components in the figures to provide a more user friendly version of the figures and to facilitate a better understanding of the novel technology described herein.

DETAILED DESCRIPTION

Certain examples of the technology disclosed herein provide significant benefits over existing pixel and liquid crystal display configurations. For example, the pixels and display provided herein may provide wider viewing angles, may reduce chromatic distortion at different viewing angles, do not suffer from bleaching problems observed with dichroic dye molecules (See "Handbook of Display Technology" by Joseph A. Castellano, Academic Press (1992), p. 219), and may provide better resolution and black levels than existing liquid crystal displays. Such improvements in the pixels and displays are referred to generally in certain instances herein as a "visual enhancement" or "visual enhancements." These and other advantages and benefits of the technology disclosed herein, will be readily recognized by the person of ordinary skill in the art, given the benefit of this disclosure.

In accordance with certain examples, particles, such as, for example, metallic particles are known to exhibit plasmon resonances which are a function of shape, material properties, surrounding material responses and orientation relative to the polarization of the incident light. Such particles are referred to in some instances herein as "nanoparticles." A "nanostructure," as used herein and as defined further below, refers to a structure, such as, for example, a carbon nanotube or nanorod, which may optionally include one or more nanoparticles. Examples of nanoparticles and nanostructures are described in more detail herein. These systems have been shown to exhibit shifted and altered responses to electromagnetic waves when they are in the form of aggregates or have fractal structures. Examples of this are seen in Surface Enhanced Raman Scattering (SERS). Gold and silver colloids, for example, have been shown to undergo strong color changes when they are concentrated due to interactions between colloid particles. These changes are illustrated, for example, in Michael Quinten: "Optical Effects Associated with Aggregates of Clusters", *Journal of Cluster Science*, Vol. 10. No. 2, 1999. For example, for silver particles, the isolated particle sample appears yellow due to the surface plasmon, which is peaked at the wavelengths of blue light. The color of the aggregated samples changes, however, into orange, brown, and green as the amount of silver particles in the aggregate increases. For gold, the red color of the isolated particle sample changes for the aggregated sample into violet and blue as the amount of gold particles in the aggregate increases. The role of inter-particle separation on the color has been demonstrated by Kotov et al. (*J. Phys. Chem.* (1995) 99, 13065) where multilayers of $SiO_2$ coated gold nanoparticles are formed. Particles with thicker shells are redish whereas particles which have thinner shells and are closer, are blue.

There has been a significant amount of work focused on the synthesis of metallic and semiconducting nanostructures with asymmetric shapes. Most developed is the class of materials called nanorods. Examples of nanorod models of the absorptive and scattering response in the long wavelength limit are shown by Van Duyne, et al. "Electromagnetic Mechanism of Surface-enhanced Spectroscopy" from the Handbook of Vibrational Spectroscopy, John Wiley & Sons Ltd, 2002. These structures have been made from pure and compound semiconductors as well as metals such as gold, silver and alloys. The methods of synthesis include vapor phase and solution chemistry. Reference in this regard may be made to N. R. Jana, L. Gearhart and C. J. Murphy, J. Phys. Chem. B 105, 4065, 2001. Structures which have an inner and outer core and possess asymmetry have also been developed. These include nanorods with sheaths, with the metal inside or outside or the use of two different semiconductors for each layer. Another class of materials is referred to as nanotubes, e.g., carbon nanotubes. These structures may be a single wall or a multiwall structure and may be formed in a variety of shapes.

In accordance with certain examples, the surfaces of nanoparticles and nanostructures may also be functionalized and chromophores may associated, e.g., reversibly or irreversibly. For example, nanotubes may be capped to create structures such as nanohorns. Carbon nanotubes and other moieties of the structures can be doped with various species, e.g., nanoparticles, including metal atoms and can also be used as scaffolds for the attachment of nanoparticles of noble metals and semiconductors. An example of this method of creating anisotropic nanometal structures in this regard may be made to "Linear Assemblies of Silica-Coated Gold Nanoparticles using Carbon Nanotubes as Templates", by Correa-Duante et al., Adv. Mater. 2004, 16(23), p. 2179. A common feature of these structures, including arrays created on scaffolds, has the property that its absorption and scattering of light is a function of its orientation relative to the polarization of light. In metallic systems, the plasmon resonances are different in the direction of the long axis and short axis respectively. Varying the aspect ratio can produce noticeable changes in the color of the solutions of rods even in the case of random orientation. Reference in this regard may be made to "Controlling the Aspect Ratio of Inorganic Nanorods and Nanowires" by C. J. Murphy, Adv. Mater. 2002, 14(80). In the case of semiconductors and carbon nanotubes, the absorption is highly anisotropic. In the case of plasmon resonance, not only is the position of the resonance different but the strength of the resonance along an axis and the strength of the resonance orthogonal to the axis are different. For gold nanorods, the linewidth of the long axis plasmon resonance can be considerably narrower.

Nanorods and rod like structures may be oriented by electric fields. See, for example, "Alignment of Rod-Shaped Gold Particles by Electric Fields", Van der Zande et al. J. Phys. Chem. B. 103(5754), 1999. Nanorods and rod like structures may be oriented when embedded within liquid crystals (which may also be orientable using electric fields). Recent work at the University of Manchester has demonstrated this effect with carbon nanotubes while similar effects have been observed with CdSe nanorods. Reference in this regard may be made to "Aligning and Reorienting Carbon Nanotubes with Nematic Liquid Crystals", by Dierking et al., Adv. Mater. 2004, 16(11) Pg. 865. The basic effect is from the minimization of the free energy, the entire fluid is minimized by the orientation of the nanostructures, e.g., carbon nanotubes, and the liquid crystals.

It is also been shown that when nanoparticles are brought close enough to interact, such as a string of spherical particles on carbon nanotubes or attached to DNA, an anisotropic structure may be formed. Reference in this regard may be made to "Organization of 'nanocrystal molecules' using DNA" by A. Paul Alivisatos, et al. *Nature* 382 (609) 1996.

Most of the liquid crystal (LC) displays today suffer from severe chromatic distortion when viewed at different angles, e.g., colors are shifted at non-orthogonal or non, near-orthogonal viewing angles. Existing displays also are limited in their brightness as much of the light is lost in the polarization requirement of some LC systems. Existing displays also have limited viewing angles. These negative attributes lead to gaps in the price performance matrices for displays and have limited the applications of LC displays.

In accordance with certain examples, the exact nature and chemical makeup of the nanoparticles used in the exemplary pixels, displays and inks disclosed herein may vary depending on the device that uses them. In some examples, the nanoparticles are charged or receptive to being charged (e.g., positive, negative, a partial positive charge, a partial negative charge or a dipole), whereas in other examples, the nanoparticles are uncharged or neutral. In certain examples, a nanoparticle comprises a non-conductive material, a conductive material or a semi-conductive material. In some examples, the nanoparticle comprises two or more of a non-conductive material, a conductive material and a semi-conductive material. In examples where the nanoparticle includes a non-conductive material, the non-conductive material may be selected from one or more of titania, zinc oxide, clays, magnesium silicate, glasses or other suitable non-conductive materials. In examples where the nanoparticle includes a conductive material, the conductive material may be selected from metals, or combinations of metals, such as, for example, transition metals and alloys of these metals. In certain examples, the conductive material includes one or more of silver, gold, platinum, palladium, ruthenium, rhodium, osmium, iridium and alloys of these metals. In examples where the nanoparticle includes semi-conductive materials, the semi-conductive material may be selected from one or more of cadmium selenide, cadmium telluride, zinc selenide, zinc telluride, cadmium phosphide, cadmium arsenide, gallium selenide, aluminum arsenide and the like. It will be recognized by the person of ordinary skill in the art, given the benefit of this disclosure, that the optical characteristics of a pixel, display or ink may vary depending on the composition of the nanoparticles and that non-conductive nanoparticles, conductive nanoparticles and semi-conductive nanoparticles may not provide the same optical response when concentrated. In some examples, one or more nanoparticles may be part of a larger structure such as, for example, a nanostructure. In other examples, a core shell nanostructure may be used in the pixels, display and inks disclosed herein. Additional examples of nanoparticles and materials suitable for use in the pixels, displays and inks provided herein may be found, for example, in U.S. Pat. No. 5,882,779 and in commonly owned U.S. Pat. application No. 11/091,702 and entitled "Plasmon Nanoparticles and Pixels, Displays and Inks Using Them" and filed on March 28, 2005, the entire disclosure of each of which is hereby incorporated herein by reference for all purposes.

In accordance with certain examples, the overall shape of the nanoparticles and nanostructures disclosed herein may vary. For example, the nanoparticles, or nanostructures, may be elliptical, spheroid, triangular, rectangular, or may take other suitable geometries commonly found in atomic and molecular structures. In some examples, the nanoparticle may include an electrically conductive shell around an insulating core, or an electrically insulating shell around a conductive core. For example, an insulating core may be formed from non-conductive materials such as those described herein. In certain examples, a nanoparticle may include an inner medium, which may be, for example, a metal or a dielectric. The nanoparticle may also include an outer medium, which may be, for example, a dielectric or metal that surrounds the inner medium. The nanoparticle may also include an external medium, which may be a surrounding dielectric medium. In certain examples, the dielectric for any one or more of inner, outer or external media may be a fluid, such as a gas, liquid, supercritical fluid and the like. In some examples, the dielectric is selected from one or more materials that are non-conductive at the frequencies (or wavelengths) of interest or is a material which does not possess a negative real dielectric constant. Illustrative examples of dielectric materials suitable for use in pixels, displays and inks include, but are not limited to, oxides, such as $TiO_2$, $ZnO$, $SiO_2$, or polymeric materials such as PMMA or styrene. Depending on the material properties, size and shape geometries of nanoparticles, e.g., core-shell nanoparticles, they can be made to exhibit a specific plasmon resonance. In some examples, nanoparticles may also be made of a single medium of material, e.g., a metal. The person of ordinary skill in the art, given the benefit of this disclosure, will be able to select and/or design suitable nanoparticles for use in the illustrative pixels, displays and inks disclosed herein. Exemplary nanoparticles suitable for use in the pixels, displays and inks disclosed herein include, but are not limited to, those described in Liz-Marzan, L. M. "Nanometals: Formation and Color." *Materials Today, pp.* 26–31 (February 2004). Illustrative methods for producing nanoparticles include, but are not limited to, those methods described in U.S. Pat. No. 5,882,779, the entire disclosure of which is hereby incorporated herein by reference for all purposes.

In accordance with certain examples, the exact size, e.g., diameter, of the nanoparticles used in the exemplary pixels, displays and inks disclosed herein may vary, but the particle size is typically much smaller than the wavelength of transmitted, reflected or emitted light. In certain examples, the smallest dimension of the diameter of a nanoparticle filled microcapsule, or a nanostructure filled microcapsule, is less than about 500 nm, more particularly less than about 200 nm or 100 nm, e.g., about 50 nm in diameter, 25 nm in diameter or less. Similarly, the exact form or topology of any higher ordered structures that may form from the nanoparticles, or the nanostructures, may vary and illustrative forms include, but are not limited to, fractal structures, linear forms, cross-shaped forms, T-shaped forms, trapezoid-shaped forms, U-shaped forms, gamma shaped forms, corner-shaped forms or other suitable forms that the aggregate may adopt. The concentration of the nanoparticles (or nanostructures) may vary depending on the intended use, e.g., pixel, ink, etc., and the particular chemical makeup of the nanoparticles.

In accordance with certain examples, a suitable nanoparticle (or nanostructure) concentration includes, but is not limited, to those concentrations that are effective to improve the optical properties of the pixel, e.g., to provide visual enhancement by one or more of reducing chromatic distortion, widening the viewing angle, providing better black levels, providing better contrast and/or resolution and the like. In certain examples, pixels comprising an anisotropic nanoparticle or an anisotropic nanostructure, or both, may be configured to reduce chromatic distortion as a function of viewing angle when non-orthogonal, e.g., reduce chromatic distortion by at least 10% as compared to the amount of chromatic distortion present in a pixel comprising a liquid crystal material but no anisotropic nanoparticle or an anisotropic nanostructure. For example, as a viewer moves from a viewing angle that is orthogonal to the display screen to a viewing angle that is about 15–20 degrees from orthogonal, chromatic distortion in the pixel provided herein may be reduced by at least about 10% as compared to the amount of chromatic distortion present in a pixel including a liquid crystal material but no anisotropic nanoparticle or an anisotropic nanostructure. Additional suitable sizes, forms and concentrations that provide visual enhancement will be readily selected by the person of ordinary skill in the art, given the benefit of this disclosure.

In accordance with certain examples, nanoparticles, or nanostructures, suitable for use in the pixels, displays and inks disclosed herein may also include modified surfaces. For example, the surface of a nanoparticle, or one or more surfaces of a nanostructure, may be modified to be magnetic, modified to have charged and/or uncharged groups, modified to render the nanoparticle asymmetric or anisotropic, or may be modified in other suitable manners using suitable chemical reagents, such as those commonly used to accomplish chemical surface modification. The use of anisotropic nanoparticles may lead to polarization sensitive concentration color effects which may be useful for pixels, displays and inks.

In accordance with certain examples, the exact nature and composition of a liquid crystal (LC) in a pixel, such as a liquid crystal display pixel suitable for use in a liquid crystal display, may vary. The pixel may include only a single type of LC, multiple different types of LCs, etc. In certain examples, the LC is one or more of a nematic liquid crystal, a twisted nematic liquid crystal, a ferroelectric liquid crystal, a surface stabilized ferroelectric liquid crystal, and an E7 liquid crystal. The liquid crystal may be free in a medium or may be intercalated or dispersed in a host matrix, such as a polymer host matrix, e.g., a polymer dispersed liquid crystal (PDLC) host as described herein. The person of ordinary skill in the art, given the benefit of this disclosure, will be able to select suitable LCs and LC host materials for use in the pixels, displays and inks disclosed herein.

Figure 1A:
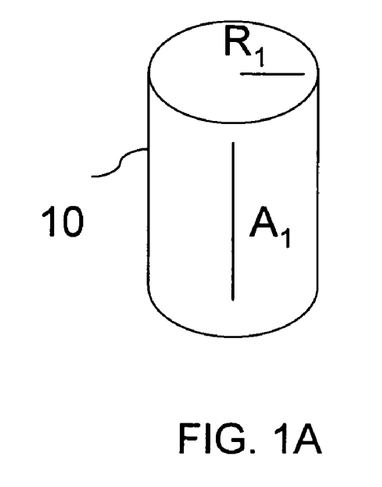
FIG. 1A is a schematic of an anisotropic nanorod and FIG. 1B is a schematic of an anisotropic nanoellipse, each of which may be oriented in response to a stimulus, in accordance with certain examples.
Figure 1B:
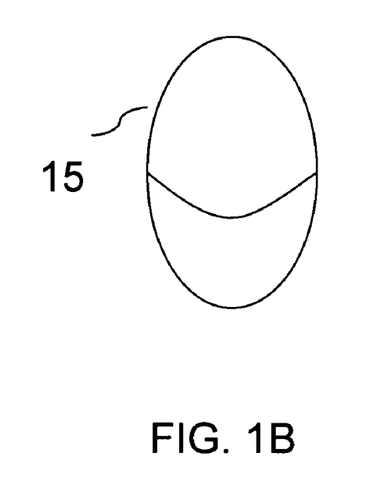

In accordance with certain examples, a dramatic change in light emission may occur if an orientation change is achieved in an anisotropic nanoparticle, or in an anisotropic nanostructure, where the absorption and emission drastically change to suppress or enhance transmission, reflection or emission depending on an initial and a final orientation relative to the incident polarization. For example and referring to FIGS. 1A and 1B, two schematic examples of an anisotropic nanostructure 10 and 15 are shown. In the configuration shown in FIG. 1A, the nanostructure 10 is in the form of a rod, e.g., a nanorod or a nanotube, where a radial dimension $R_1$ is not equal to an axial dimension $A_1$. In the configuration shown in FIG. 1B, a nanoellipse 15 is shown. Nanoparticles or nanostructures, e.g., nanorods, nanotubes, nanoellipses, core shell structures and other high aspect ratio structures, may be reversibly oriented such that their long axis is parallel or orthogonal to a plane of excitation polarization. The person of ordinary skill in the art, given the benefit of this disclosure, will be able to design suitable pixels, displays and inks comprising nanoparticles and nanostructures that are capable of orienting parallel or orthogonal to the plane of excitation polarization.

Figure 2:
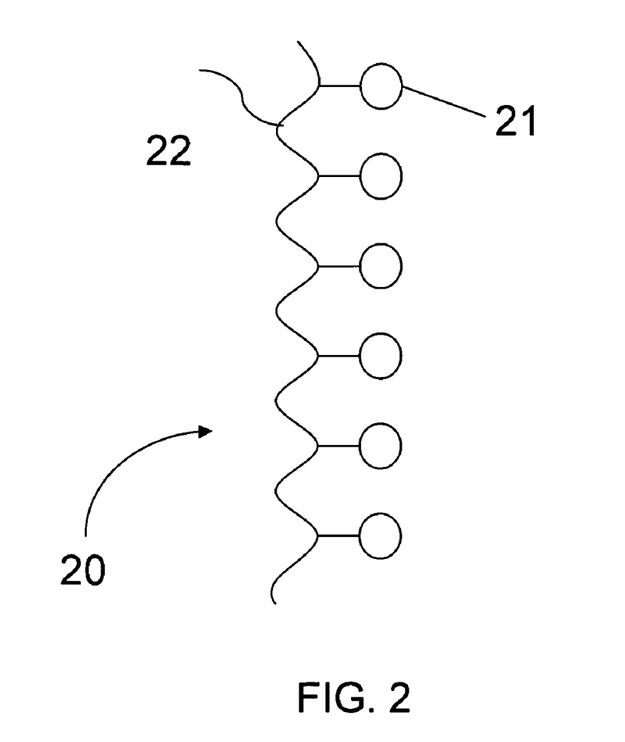
FIG. 2 is a schematic of long chain molecule or carbon nanotube including semiconductor or metal nanoparticles such as those of FIGS. 1A and 1B, in accordance with certain examples.

In accordance with certain examples, elongated nanoparticles and nanostructures, e.g., nanotubes, nanorods, nanoellipses, core shell structures and other high aspect ratio structures, may be formed, for example, by linking semiconductor or metal nanoparticle spheres 21 (or anisotropic nanostructure 10 or 15) along a wall or side 22 of long chain molecule or carbon nanotube, as depicted schematically in FIG. 2, to form nanostructure 20. It will be recognized by the person of ordinary skill in the art, given the benefit of this disclosure, that the individual components of an anisotropic nanostructure need not be anisotropic (though they may be) as long as the overall nanostructure is anisotropic.

Figure 3:
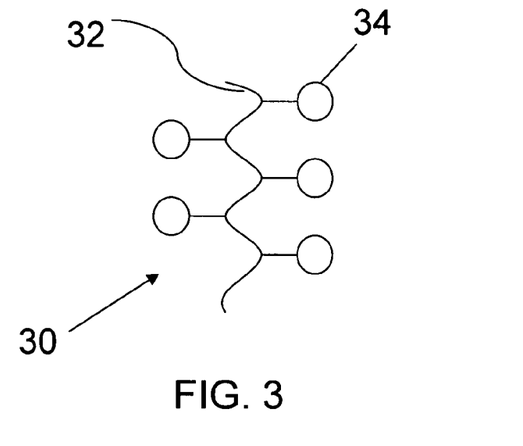
FIG. 3 is a schematic of carbon nanotube including associated fluorescent chromophores, in accordance with certain examples.

In certain examples, anisotropic nanostructures may be formed by linking one or more luminescent chromophores, e.g., chromophores which fluoresce, phosphoresce or scatter light after being excited, to a nanoparticle or other suitable structure, such as a carbon nanotube. For example and referring to FIG. 3, a carbon nanotube 32 includes attached fluorescent chromophores, such as fluorescent chromophore 34, to form an anisotropic nanostructure 30. The fluorescent chromophore 34 may be covalently linked with carbon nanotube 32, may irreversibly or reversibly associate with the carbon nanotube 32 through one or more ionic or dipole interactions or may interact with carbon nanotube 32 using other suitable interactions. In examples where the fluorescent chromophore reversibly associates with the carbon nanotube, the dissociation constant is may be $10^{-9}$ moles/L or less to provide tight binding. Depending on the initial and final orientations (relative to incident polarization) of the nanostructure 30, the nanostructure 30 may be used to suppress or enhance light emission, transmission and reflection. In addition, other suitable elements, e.g., polarizers, may be employed to enhance contrast.

In accordance with certain examples, the anisotropic nanoparticles and/or anisotropic nanostructures disclosed herein may orient in response to a stimulus, such as an electric field, magnetic field, acoustic wave, pressure or temperature gradients, hydrodynamic forces, thermophoretic forces, electrophoretic forces and the like. In some examples, the orientation may be created by direct action of an electric field or a magnetic field on the anisotropic nanoparticles which may or may not have dipoles or charges. In other examples, the orientation may be accomplished by hydrodynamic forces created by an orientable fluid such a liquid crystal (LC) material or a free energy minimization leading to a naturally oriented phase at high rod density. Nanorods or nanotubes in LC materials, which are randomly oriented, may themselves be randomly oriented. If the LC director field is oriented, the nanorods or nanotubes may also orient to minimize free energy. Such effects have been realized with LCs and long chain dyes. In certain examples, the anisotropic nanoparticles (or anisotropic nanostructures) orient in a first direction, e.g., orthogonal to a plane of polarized light, such that substantially no light is transmitted, reflected or emitted in the absence of a stimulus. In response to a stimulus, the anisotropic nanoparticles may change their orientation, e.g., to be parallel to the plane of polarized light, so that light may be transmitted, reflected or emitted. In other examples, the anisotropic nanoparticles (or anisotropic nanostructures) orient in a first direction, e.g., parallel to a plane polarized light, such that light is transmitted, reflected or emitted in the absence of a stimulus. In response to a stimulus, the anisotropic nanoparticles (or anisotropic nanostructures) may change their orientation, e.g., to be orthogonal to the plane of polarized light, so that substantially no light may be transmitted, reflected or emitted in the presence of the stimulus. In some examples, the anisotropic nanoparticles (or anisotropic nanostructures) are dispersed with liquid crystals or disposed in a host matrix of the liquid crystals, and as the liquid crystals alter their orientation in response to a stimulus, the anisotropic nanoparticles (or anisotropic nanostructures) orient in the same manner as the liquid crystals. As used herein in the context of a host matrix of the liquid crystals, the term "dispose" refers to coating, impregnating, intercalating or adding nanoparticles or nanostructures to the host matrix. Additional configurations will be readily selected by the person of ordinary skill in the art, given the benefit of this disclosure.

In accordance with certain examples, in an LC material containing plasmon supporting symmetrical or anisotropic nanoparticles, the plasmon absorption and scattering may change in magnitude and wavelength when the surrounding material, e.g., LC, changes its optical properties in the presence of a stimulus, e.g., an applied field. This result may be used alone or with the orientation effect to enhance or create contrast for a pixel. In certain examples, elongated particles (e.g., nanotubes, nanorods, core shell structures and other high aspect ratio structures) of carbon, semiconductors, dielectrics, metals or composite structures based on these materials may also be used as a means of lowering or modifying the switching and stability properties of liquid crystalline phases in the absence or presence of a stimulus, such as an electric, magnetic or acoustic field. The person of ordinary skill in the art, given the benefit of this disclosure, will be able to design suitable pixels using anisotropic nanoparticles and anisotropic nanostructures.

In accordance with certain examples, the exact configuration of the pixel may vary and, for illustrative purposes only, several exemplary pixel configurations are described herein. In certain examples, the pixel format may be based on the differential absorption and scattering by anisotropic nanoparticles of metal or semiconductors or combinations of both, including plasmonic and internal electron hole processes or a combination of both. In some examples the pixel may be activated to absorb or scatter light differently by orienting the particles in response to a stimulus, such as, for example, an electric field or a magnetic field or both.

Figure 4A:
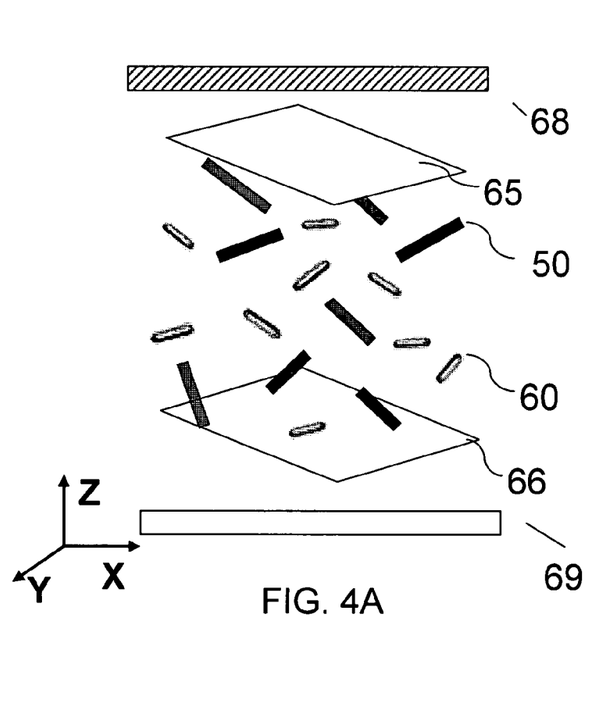
FIGS. 4A and 4B are schematic examples of a transmissive or reflective pixel, in a first state (FIG. 4A) and a second state (FIG. 4B), including anisotropic nanostructures such as those of FIG. 1 or FIG. 2, in accordance with certain examples.
Figure 4B:
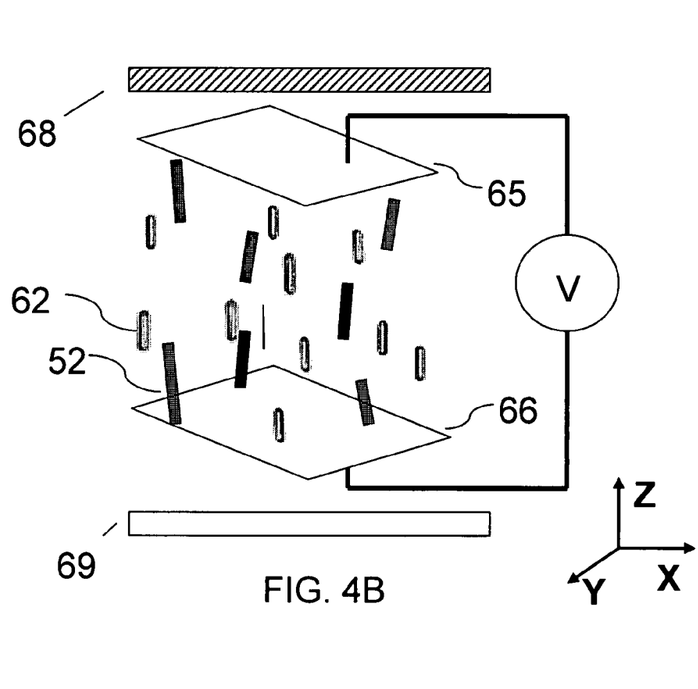

An example of this type of pixel is shown schematically in FIGS. 4A and 4B. Though FIGS. 4A and 4B refer to anisotropic nanoparticles, it will be recognized by the person of ordinary skill in the art, given the benefit of this disclosure, that anisotropic nanostructures may be used in place of, or in addition to, the anisotropic nanoparticles. Referring now to FIG. 4A, an anisotropic nanoparticle in a first state 50 and a liquid crystal in a first state 60 may each be oriented substantially perpendicular (e.g., in the X-Y plane), in the absence of a stimulus, to a plane of incoming light (e.g., light polarized in the Z-direction) from, for example, backlight 69. Surfaces 65 and 66 may take the form of electrodes, for example, for application of an electric field. In the first state, the anisotropic particles and the liquid crystals may prevent transmittance or reflectance of light or may allow transmittance or reflectance of light depending on the plane of polarization of the light. Referring now to FIG. 4B, as a stimulus, such as an electric field, for example, is applied, the anisotropic particle may orient in a second state 52 and the liquid crystal may orient in a second state 62, e.g., each may orient parallel to the Z-direction. In the second state the anisotropic particles and the liquid crystals may prevent transmittance or reflectance of light or may allow transmittance or reflectance of light depending on the plane of polarization of the light. In some examples, the pixel in the first state may transmit or reflect a first color, e.g., red, but in a second state, may transmit or reflect a different color, e.g., green or blue. The pixel may also include other optional features, such as polarizer 68. It will be within the ability of the person of ordinary skill in the art, given the benefit of this disclosure, to design suitable transmissive or reflective pixels.

In accordance with certain examples, another pixel configuration may be based on the differential absorption, transmission or scattering by anisotropic nanoparticles or anisotropic nanostructures, such as carbon nanotubes with or without associated nanoparticles and/or chromophores. Illustrative carbon nanotubes may be single wall, multiwall, associated with one or more chromophores so that the nanotube may provide the torque and the chromophore may provide additional absorption or emission bands. The person of ordinary skill in the art, given the benefit of this disclosure, will be able to design suitable pixels based on the differential absorption, transmission or scattering by anisotropic nanoparticles and/or anisotropic nanostructures.

In accordance with certain examples, the pixels disclosed herein may be illuminated from a top surface of the pixel or may be illuminated from a bottom or back surface of the pixel. For example, if illuminated from the top surface, the pixel may be considered passive and may locally change colors in a pixelated format. Similarly, if illuminated from the back surface, the effect may be used to affect the transmission of various light sources to create the image. Suitable light sources for illuminating the pixels will be readily selected by the person of ordinary skill in the art, given the benefit of this disclosure, and exemplary light sources include, but are not limited to, lamps, e.g., lamps emitting visible light, and light sources commonly used in liquid crystal displays.

In accordance with certain examples, an additional example of a pixel may be based on the orientation of concentrated anisotropic nanoparticles (or concentrated anisotropic nanostructures). Concentrated forms of anisotropic aggregates may take numerous forms including, for example, fractal structures, linear forms, cross-shaped forms, T-shaped forms, trapezoid-shaped forms, U-shaped forms, gamma-shaped forms, corner-shaped forms or other suitable forms that the aggregate may adopt. The exact composition of the nanostructure depends at least in part on the intended use and in certain examples the nanostructure may be a string of spherical particles on carbon nanotubes or spherical particles attached to a biopolymer, such as a polypeptide or a polynucleotide. Additional nanoparticle and/or nanostructure configurations suitable will be readily selected by the person of ordinary skill in the art, given the benefit of this disclosure.

Figure 5A:
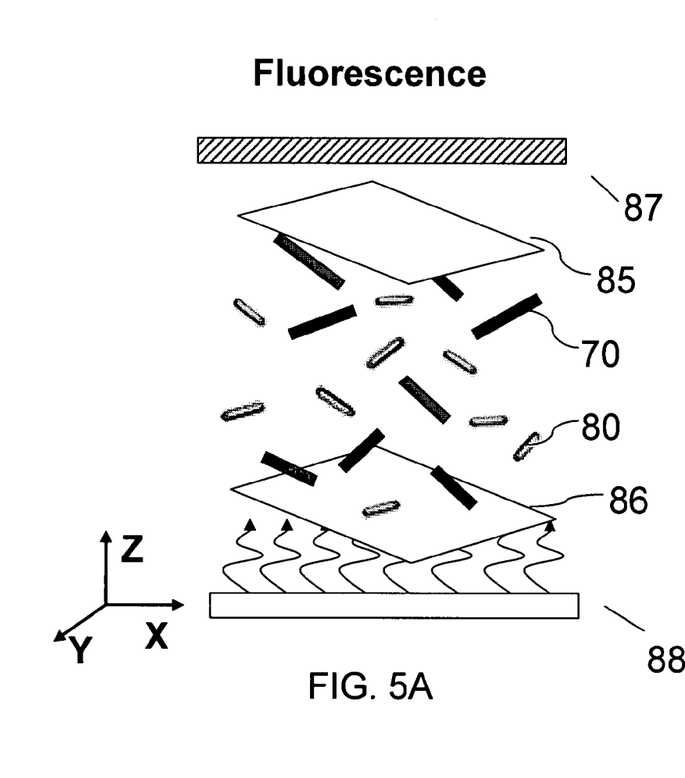
FIGS. 5A and 5B are schematic examples of an emissive pixel, in a first state (FIG. 5A) and a second state (FIG. 5B), including a plurality of anisotropic nanostructures such as those in FIG. 3, in accordance with certain examples.
Figure 5B:
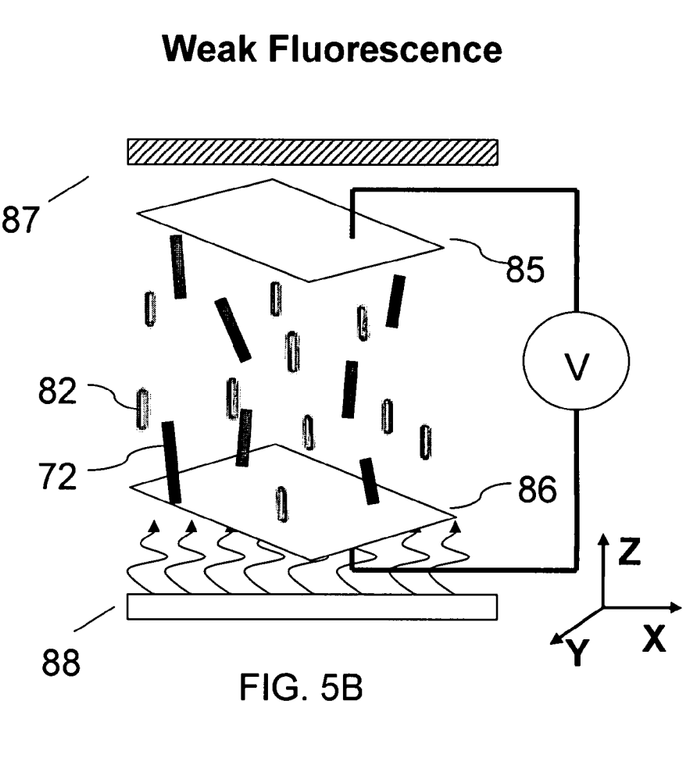
Figure 6:
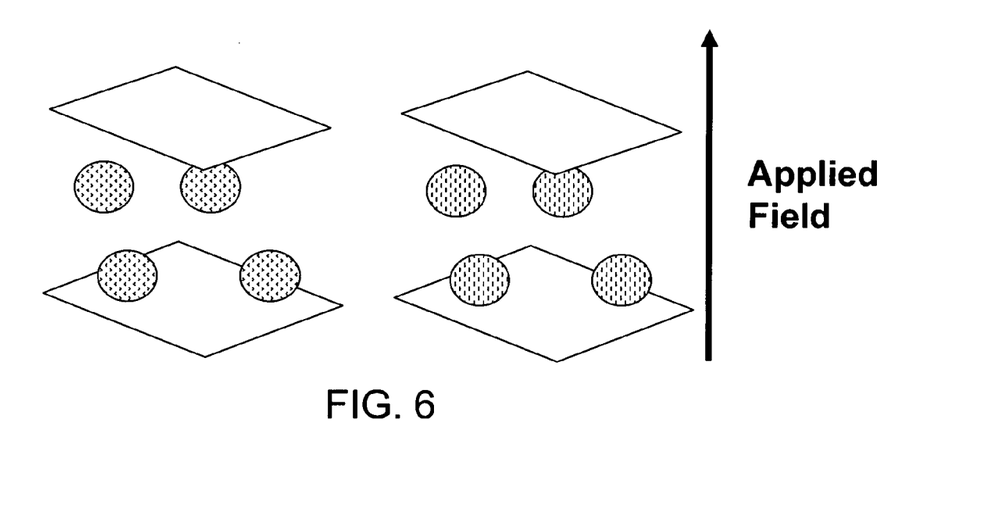
FIG. 6 is a schematic of a pixel including microencapsulated anisotropic nanostructures, in accordance with certain examples.

In accordance with certain examples, an addition pixel configuration is shown schematically in FIGS. 5A and 5B. In the illustrative configuration shown in FIGS. 5A and 5B, the pixel is configured for use in an emissive display, e.g., based on optical pumping (UV pumping for example and different emission colors created by alloying, quantum size effect and aspect ratios) of fluorescent particles of semiconductor nanorods or carbon nanotubes with or without associated chromophores. These nanotubes may include associated chromophores, semiconductor nanoparticles or quantum dots so that the nanotube may provide the torque and the nanotube and or the chromophore, semiconductor nanoparticles or quantum dots may provide the light emission. Referring to FIG. 5A, a pixel comprises an anisotropic nanostructure in a first state 70, a liquid crystal in a first state 80 and surfaces 85 and 86, which may take the form of electrodes. The pixel may also include a polarizer 87 and a UV source 88, which can provide excitation light that may or may not be polarized, e.g., may be polarized in the X-Y plane as shown in FIGS. 5A and 5B. Because the nanostructure and liquid crystal are oriented in the X-Y plane in FIG. 5A, a strong fluorescence emission (or other luminescent emission depending on the chromophore) from the pixel may be observed. If the nanorods or carbon nanotube structures are randomly oriented, they absorb an amount that is a function of the single particle absorption anisotropy and the macroscopic ensemble orientation. The emission may likewise be a function of their ensemble orientation and their absorption and emission anisotropy. Referring now to FIG. 5B, as the nanostructure orients in a second state 72 and the liquid crystal orients in a second state 82 (e.g., each orient parallel to the Z-direction) in response to a stimulus, such as an electric field, the fluorescence emission of the pixel may change from a strong fluorescence emission to a weak fluorescence emission. Alternatively, the fluorescence emission wavelength may be shifted, e.g., red-shifted or blue-shifted, after orientation of the nanostructure and the liquid crystal. Suitable UV sources include but are not limited to discharge or solid state devices such as GaN LEDs or lasers, cathode ray lamps, arc lamps and the like. It will be within the ability of the person of ordinary skill in the art, given the benefit of this disclosure, to design suitable emission pixels using anisotropic nanoparticles and anisotropic nanostructures.

Figure 7:
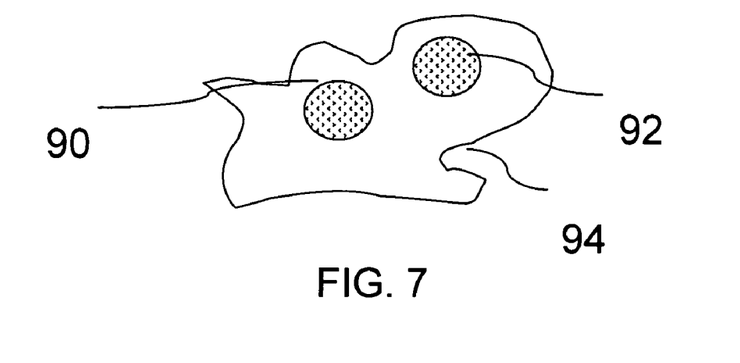
FIG. 7 is a schematic of a printable ink including microencapsulated anisotropic nanostructures in a carrier, in accordance with certain examples.

In accordance with certain examples, the anisotropic nanoparticles and anisotropic nanostructures may be dispersed with liquid crystal materials or be encapsulated to form microcapsules (see, e.g., FIG. 7). A pixel may include a single microcapsule or may include a plurality of microcapsules. Each of the plurality of microcapsules in a pixel may be the same or may be different. In addition, each microcapsule may include the same anisotropic nanoparticles and anisotropic nanostructures or may include different anisotropic nanoparticles and anisotropic nanostructures. The person of ordinary skill in the art, given the benefit of this disclosure, will be able to design suitable microcapsules comprising anisotropic nanoparticles and anisotropic nanostructures.

Figure 8:
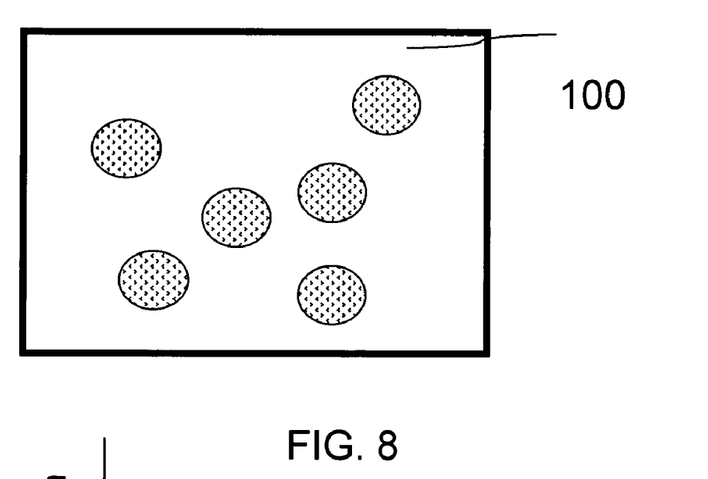
FIG. 8 is a schematic of a polymer dispersed liquid crystal (PDLC) pixel with anisotropic nanostructures, in accordance with certain examples.

In accordance with certain examples, the anisotropic nanoparticles and anisotropic nanostructures may be disposed or dispersed in voids of a polymer dispersed liquid crystal (PDLC) host as shown in FIG. 8. For example, microcapsule 100 comprises a PDLC host including a liquid crystal material and one or more of an anisotropic nanoparticle and an anisotropic nanostructure disposed in the PDLC host. The exact nature of the polymer host can vary depending on the selected liquid crystals, but preferably the polymer host does not substantially interfere, or reduce, the optical response and properties of the pixel or reduce the visual enhancement provided by the anisotropic nanoparticle and/or the anisotropic nanostructure. The polymer host may be chiral or achiral, may be colored or colorless or may take other suitable forms. Illustrative polymer hosts include, for example, NOA 73 and NOA 76, each of which is commercially available from Norland Products (Cranbury, N.J.). Additional polymer hosts will be readily selected by the person of ordinary skill in the art, given the benefit of this disclosure.

In accordance with certain examples, the pixel may also include additional components and devices necessary to apply a stimulus, e.g., an electric field or a magnetic field, to orient the materials in the pixel. For example, the pixel may include electrodes for applying electric fields and/or magnetic fields or for creating temperature gradients, may include sound wave or pressure generators or may include additional devices configured to apply suitable stimuli to the LCs, nanoparticles, nanostructures or microcapsules in the pixel. One or more surfaces of the pixel may also include a filter or material configured to remove unwanted glares, ultraviolet light reflections, or ultraviolet light transmissions, from the light reflected or transmitted by the pixel. One or more surfaces may include polarizers or materials configured to polarize the light. Additional components and devices useful with the pixels disclosed herein will be readily, selected by the person of ordinary skill in the art, given the benefit of this disclosure.

In accordance with certain examples, a liquid crystal display comprising a pixel as disclosed herein is provided. The liquid crystal display also includes one or more liquid crystal materials. In certain examples, the display may include a plurality of pixels as provided herein. Each of the pixels of the display may be constructed as described herein, or may be constructed using additional suitable methods that will be readily selected by the person of ordinary skill in the art, given the benefit of this disclosure. In certain examples, the display is configured as a flat panel display, e.g., a liquid crystal display. Each of the pixels may be configured to provide light that varies over a visible wavelength range, e.g., any wavelength between, and including 380–800 nm, or other selected wavelength range, e.g., infrared or ultraviolet. It will be within the ability of the person of ordinary skill in the art, given the benefit of this disclosure to design suitable liquid crystal displays including the pixels disclosed herein.

In accordance with certain examples, the display may also include suitable additional components and devices. For example, the display may include a lamp or light source for illuminating the pixels. The display may also include suitable polarizers, such as those found in liquid crystal displays. The display may include a power supply and suitable interfaces for receiving signals, e.g., signals from a graphics card, a television tuner or the like. It will be within the ability of the person of ordinary skill in the art, given the benefit of this disclosure, to design suitable displays using the pixels disclosed herein.

In accordance with certain examples, an ink comprising a liquid crystal material and one or more of an anisotropic nanoparticle and an anisotropic nanostructure is provided. In certain examples, the anisotropic nanoparticle or the anisotropic nanostructure remains free, whereas in other examples, the anisotropic nanoparticle or the anisotropic nanostructure may be encapsulated, with or without the LC material, to form microcapsules. In some examples, the anisotropic nanoparticle or the anisotropic nanostructure may be placed in a carrier prior to use as an ink. Referring to FIG. 7, anisotropic nanoparticles or anisotropic nanostructures have been encapsulated to form microcapsules 90 and 92 which are disposed in a carrier 94. Suitable carriers will be readily selected by the person of ordinary skill in the art, given the benefit of this disclosure and illustrative carriers include, but are not limited to, paste ink carrier (which may consist of a small amount of solvent and/or phenolic resins, and/or alkyd resins, and/or nitrocellulose, and/or rosin maleic ester, and/or thinning oils, and/or waxes, and/or metal salt driers), UV curing type ink carriers, UV curing type inks carrier that are variable in viscosity and are free radical vehicles which may consist of about 5–80% acrylated oligomer(s) such a acrylated polyurethanes, acrylated polyesters, and acrylated epoxies, 5–90% acrylated monomer(s) such as 1,6-hexanedioldiacrylate, or alkoxylated tetrahydrofurfuryl acrylate, or trimethylolpropane trimethylacrylate, 0.1–10% photoinitiator(s) such as derivatives of benzophenone, phosphine oxides, 0–10% amine synergist and 0–20% adhesion promoters such as multifunctional acid esters (all of which are commercially available from Sartomer Company, Inc. (Exton, Pa.)). Examples of resin blends and dispersion vehicles that are suitable for use as carriers include, for example, those commercially available from Lawter Intl., Inc. (Pleasant Prairie, Wis.). Additional carriers suitable for use with anisotropic nanoparticles, anisotropic nanostructures and LC materials to provide inks will be readily selected by the person of ordinary skill in the art, given the benefit of this disclosure. The microcapsules in the carrier may be disposed in a filled region and their optical response controlled through the aggregation, proximity or by the concentration of the microcapsules to impart a desired color response.

Figure 9:
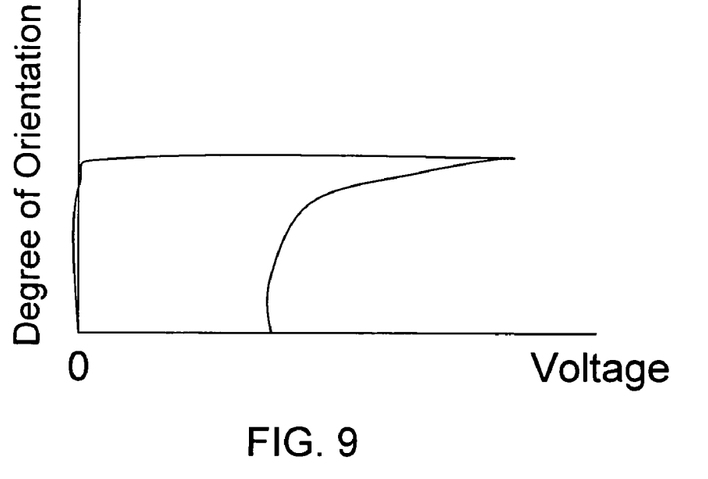
FIG. 9 is a schematic of a graph of degree of orientation versus voltage for a bistable pixel, in accordance with certain examples.

In accordance with certain examples, the pixels, displays and inks disclosed herein may be implemented in microencapsulated forms where the anisotropic nanoparticles and/or nanostructures, e.g., carbon based, semiconductor, metallic or a combination of these materials, are in either a conventional or LC type fluid. Small capsules where surface energy anchoring forces dominate may also be bistable. This feature may allow for a zero or minimal power consumption mode in both states of operation. In the ideal case, a stimulus, e.g., a voltage, may be applied that results in an orientation that remains in the absence of the stimulus due to surface anchoring forces or other energy considerations. FIG. 9 shows an example of a pixel having a bistable voltage region. Additional configurations using bistable pixels, displays and inks will be readily selected by the person of ordinary skill in the art, given the benefit of this disclosure.

In accordance with certain examples, a method of doping a pixel is provided. In certain examples, the method includes doping a liquid crystal display pixel with an anisotropic nanoparticle. In certain examples, the method includes doping a liquid crystal display pixel with an anisotropic nanostructure. In certain examples, the liquid crystal display pixel is doped with an effective amount of one or more of an anisotropic nanoparticle and an anisotropic nanostructure. The amount of dopant used may be an amount effective to provide a desired visual enhancement of a pixel but is typically less than the amount that would alter the enhancement mechanism. In certain examples, the liquid crystal display pixel is doped with an effective amount of an anisotropic nanoparticle or an anisotropic nanostructure to reduce chromatic distortion as a function of viewing angle when non-orthogonal, e.g., reduce chromatic distortion by at least about 10%. It will be within the ability of the person of ordinary skill in the art, given the benefit of this disclosure, to design pixels and displays having reduced chromatic distortion and wide viewing angles.

In accordance with certain examples, a method of facilitating visual enhancement of a pixel is disclosed. In certain examples, the method includes providing a pixel comprising a liquid crystal material and one or more of an anisotropic nanoparticle or an anisotropic nanostructure. In some examples, the method includes encapsulating one or more of one or more of a liquid crystal material, an anisotropic nanoparticle and an anisotropic nanostructure.

When introducing elements of the examples disclosed herein, the articles "a," "an," "the" and "said" are intended to mean that there are one or more of the elements. The terms "comprising," "including" and "having" are intended to be open ended and mean that there may be additional elements other than the listed elements. It will be recognized by the person of ordinary skill in the art, given the benefit of this disclosure, that various components of the examples can be interchanged or substituted with various components in other examples. Should the meaning of the terms of any of the patents, patent applications or publications referred to herein conflict with the meaning of the terms used in this disclosure, the meaning of the terms in this disclosure are intended to be controlling.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

What is claimed is:

1. A pixel comprising a liquid crystal material doped with one or more of an anisotropic nanoparticle and an anisotropic nanostructure, in which the anisotropic nanoparticle or anisotropic nanostructure has a different plasmon resonance absorption or fluorescence emission in a first orientation than a plasmon resonance absorption or fluorescence emission in a second orientation.

2. The pixel of claim 1 in which the pixel is configured to reduce chromatic distortion as a function of viewing angle when non-orthogonal.

3. The pixel of claim 2 in which the chromatic distortion is reduced by at least about 10%.

4. The pixel of claim 1 in which the anisotropic nanoparticle or the anisotropic nanostructure includes one or more members selected from the group consisting of silver, gold, platinum, palladium, ruthenium, rhodium, osmium, iridium, and alloys thereof.

5. The pixel of claim 1 further comprising two different anisotropic nanoparticles or two different anisotropic nanostructures.

6. The pixel of claim 1 in which the liquid crystal material comprises one or more members selected from the group consisting of a nematic liquid crystal, a twisted nematic liquid crystal, a ferroelectric liquid crystal, a surface stabilized ferroelectric liquid crystal, and an E7 liquid crystal.

7. The pixel of claim 1 in which the anisotropic nanostructure comprises an anisotropic nanotube or an anisotropic nanorod.

8. The pixel of claim 7 in which the anisotropic nanotube comprises one or more members selected from the group consisting of a single wall nanotube, a multiwall nanotube, a single wall nanotube comprising an associated chromophore and a multiwall nanotube comprising an associated chromophore.

9. The pixel of claim 1 in which the anisotropic nanoparticle or the anisotropic nanostructure emits light in response to excitation.

10. The pixel of claim 1 in which the anisotropic nanoparticle or the anisotropic nanostructure is disposed in a liquid crystal host material.

11. The pixel of claim 1 in which the anisotropic nanoparticle or the anisotropic nanostructure is encapsulated to form a microcapsule.

12. The pixel of claim 11 in which the liquid crystal material is encapsulated in the microcapsule.

13. The pixel of claim 1 in which the anisotropic nanoparticle or the anisotropic nanostructure comprises a semiconductor.

14. A liquid crystal display comprising the pixel of claim 1.

15. The liquid crystal display of claim 14 in which each pixel of the liquid crystal display comprises the pixel of claim 1.

16. An ink comprising a liquid crystal material doped with one or more of an anisotropic nanoparticle and an anisotropic nanostructure, in which the anisotropic nanoparticle or anisotropic nanostructure has a different plasmon resonance absorption or fluorescence emission in a first orientation than a plasmon resonance absorption or fluorescence emission in a second orientation.

17. The ink of claim 16 in which the anisotropic nanoparticle or the anisotropic nanostructure is encapsulated to form a microcapsule.

18. The ink of claim 16 in which the liquid crystal material is one or more members selected from the group consisting of a nematic liquid crystal, a twisted nematic liquid crystal, a ferroelectric liquid crystal, a surface stabilized ferroelectric liquid crystal, and an E7 liquid crystal.

19. The ink of claim 16 further comprising a carrier.

20. The ink of claim 19 in which the carrier is a paste ink carrier or a UV curing ink carrier, or combinations thereof.

21. A method comprising doping a liquid crystal display pixel with one or more of an anisotropic nanoparticle and an anisotropic nanostructure, in which the anisotropic nanoparticle or anisotropic nanostructure has a different plasmon resonance absorption or fluorescence emission in a first orientation than a plasmon resonance absorption or fluorescence emission in a second orientation.

22. The method of claim 21 further comprising configuring the anisotropic nanoparticle or the anisotropic nanostructure to be present in an amount effective to reduce chromatic distortion, as a function of viewing angle when non-orthogonal, by at least about 10%.

23. A method of facilitating visual enhancement of a pixel by providing a pixel comprising a liquid crystal material doped with one or more of an anisotropic nanoparticle and an anisotropic nanostructure, in which the anisotropic nanoparticle or anisotropic nanostructure has a different plasmon resonance absorption or fluorescence emission in a first orientation than a plasmon resonance absorption or fluorescence emission in a second orientation.

24. The pixel of claim 1 in which the anisotropic nanoparticle or the anisotropic nanostructure is selected to provide a plasmon absorption resonance or fluorescence emission for visual enhancement of the pixel.

* * * * *